(12) United States Patent
Deal

(10) Patent No.: US 11,345,411 B2
(45) Date of Patent: May 31, 2022

(54) TOOLLESS MUD FLAP MOUNTING SYSTEM AND METHOD

(71) Applicant: Kenneth Blake Deal, Reno, NV (US)

(72) Inventor: Kenneth Blake Deal, Reno, NV (US)

(73) Assignee: MFC Technology Corp., Boulder City, NV (US)

( * ) Notice: Subject to any disclaimer, the term of this patent is extended or adjusted under 35 U.S.C. 154(b) by 0 days.

(21) Appl. No.: 17/248,291

(22) Filed: Jan. 19, 2021

(65) Prior Publication Data

US 2021/0331746 A1    Oct. 28, 2021

Related U.S. Application Data

(60) Provisional application No. 62/704,152, filed on Apr. 24, 2020.

(51) Int. Cl.
*B62D 25/16* (2006.01)
*B62D 25/18* (2006.01)

(52) U.S. Cl.
CPC .......... *B62D 25/163* (2013.01); *B62D 25/18* (2013.01)

(58) Field of Classification Search
CPC ...... B62D 25/163; B62D 25/18; B62D 25/16; B62D 25/168; B62D 25/182; B62D 25/188; F16B 2/00; A44B 11/12
See application file for complete search history.

(56) References Cited

U.S. PATENT DOCUMENTS

| 1,809,711 A | 6/1931 | Kile |
| 2,621,944 A | 12/1952 | Schatzman |
| 2,826,428 A | 3/1958 | Lincoln |
| 3,219,363 A * | 11/1965 | Dalsey ................ B62D 25/188 280/851 |
| 3,285,624 A | 11/1966 | Aber |
| 3,778,086 A | 12/1973 | Moore et al. |

(Continued)

FOREIGN PATENT DOCUMENTS

| CA | 2777976 A1 * | 11/2012 | ........... B62D 25/188 |
| CA | 2810695 A1 * | 9/2013 | .............. F16B 5/121 |

(Continued)

OTHER PUBLICATIONS

Translated CN-108644199-A (Year: 2021).*

*Primary Examiner* — James A Shriver, II
*Assistant Examiner* — Ian Bryce Shelton
(74) *Attorney, Agent, or Firm* — Dunlap Bennett & Ludwig, PLLC

(57) ABSTRACT

A mud flap mounting assembly and system is disclosed. A vehicle body and mud flap are provided as part of the overall system. Advantageously, a toollessly-operated mud flap clamp assembly is provided. The mud flap clamp assembly includes a plurality of mud flap clamp units installed on the vehicle body. Each of the plurality of mud flap clamp units includes a flap clamp bracket, a flap pressure plate, and a flap clamp. Each flap clamp bracket selectively engages a first side of the mud flap, and each flap pressure plate selectively engages a second side of the mud flap. Each flap clamp is operable to a first position such that a clamping force is applied to each respective flap pressure plate and such that the mud flap is frictionally engaged with and retained by each respective flap clamp bracket and each respective flap pressure bracket.

10 Claims, 5 Drawing Sheets

(56) References Cited

U.S. PATENT DOCUMENTS

| | | | |
|---|---|---|---|
| 3,877,722 A | 4/1975 | Conner | |
| 3,934,901 A * | 1/1976 | Hammerly | B62D 25/188 280/851 |
| 3,953,053 A | 4/1976 | Arenhold | |
| 4,268,052 A | 5/1981 | Sullivan | |
| 4,293,140 A * | 10/1981 | Bell | B62D 25/18 280/851 |
| 4,326,727 A | 4/1982 | Rock | |
| 4,354,690 A * | 10/1982 | Hanson | B62D 25/188 280/851 |
| 4,572,532 A * | 2/1986 | Early | B62D 25/188 24/500 |
| 4,856,816 A | 8/1989 | Francis | |
| 4,923,215 A | 5/1990 | Williams | |
| 5,044,667 A | 9/1991 | Manning | |
| 5,048,868 A | 9/1991 | Arenhold | |
| 5,291,638 A * | 3/1994 | Huang | A44B 11/14 24/170 |
| D376,995 S * | 12/1996 | Veach | D11/216 |
| 6,098,859 A * | 8/2000 | Bortner | A44B 11/12 224/195 |
| 6,116,628 A | 9/2000 | Adrian | |
| 6,367,841 B1 | 4/2002 | Matthew | |
| 6,868,587 B2 * | 3/2005 | Rard | A44B 11/125 24/170 |
| 6,994,376 B1 | 2/2006 | Deering et al. | |
| 7,226,086 B2 | 6/2007 | Haynes | |
| 7,384,071 B2 | 6/2008 | Hartmann et al. | |
| 7,537,243 B1 * | 5/2009 | Perry | B62D 25/18 280/152.3 |
| 8,327,507 B2 * | 12/2012 | Eisinger | B60R 22/105 24/170 |
| 8,579,314 B2 | 11/2013 | Prazen et al. | |
| 8,905,418 B2 | 12/2014 | Dixon | |
| 9,434,419 B1 * | 9/2016 | Casto, Jr. | B62D 25/182 |
| 11,019,887 B1 * | 6/2021 | Huang | A44B 11/06 |
| 2002/0140199 A1 * | 10/2002 | Abercrombie | B62D 25/182 280/154 |
| 2005/0110266 A1 * | 5/2005 | Barr | B62D 25/188 280/847 |
| 2005/0212282 A1 | 9/2005 | Markham | |
| 2007/0036948 A1 * | 2/2007 | Jaeger | B60R 13/04 428/192 |
| 2007/0216128 A1 * | 9/2007 | Morton | B62D 25/188 280/154 |
| 2012/0217719 A1 * | 8/2012 | Moore | B62D 25/18 280/154 |
| 2013/0140804 A1 * | 6/2013 | Ward | F16M 13/02 280/851 |
| 2013/0193300 A1 * | 8/2013 | Eklund | B62D 25/188 248/610 |
| 2013/0221650 A1 | 8/2013 | Wiltshire et al. | |
| 2014/0312604 A1 * | 10/2014 | Carrillo | B62D 25/163 280/851 |
| 2016/0031488 A1 * | 2/2016 | Wylezinski | B62D 25/163 280/154 |
| 2019/0168819 A1 * | 6/2019 | Blomberg | B62D 25/188 |
| 2019/0357635 A1 * | 11/2019 | Bessho | A44B 11/12 |
| 2020/0140020 A1 * | 5/2020 | Cooper | B62D 25/168 |

FOREIGN PATENT DOCUMENTS

| | | | | |
|---|---|---|---|---|
| CA | 2813890 A1 * | 10/2013 | | B60B 39/12 |
| CA | 2810100 A1 * | 9/2014 | | B62D 25/188 |
| CA | 2955509 A1 * | 6/2018 | | B60D 1/58 |
| CA | 3017177 A1 * | 3/2019 | | B62D 25/163 |
| CN | 108644199 A * | 10/2018 | | |
| DE | 102017006837 A1 * | 1/2019 | | B62D 25/163 |
| EP | 0401659 A1 * | 12/1990 | | B62D 25/18 |
| GB | 2042619 A * | 9/1980 | | B62D 25/18 |
| KR | 20140080698 A | 7/2014 | | |
| WO | WO-2018114707 A1 * | 6/2018 | | B62D 25/18 |

\* cited by examiner

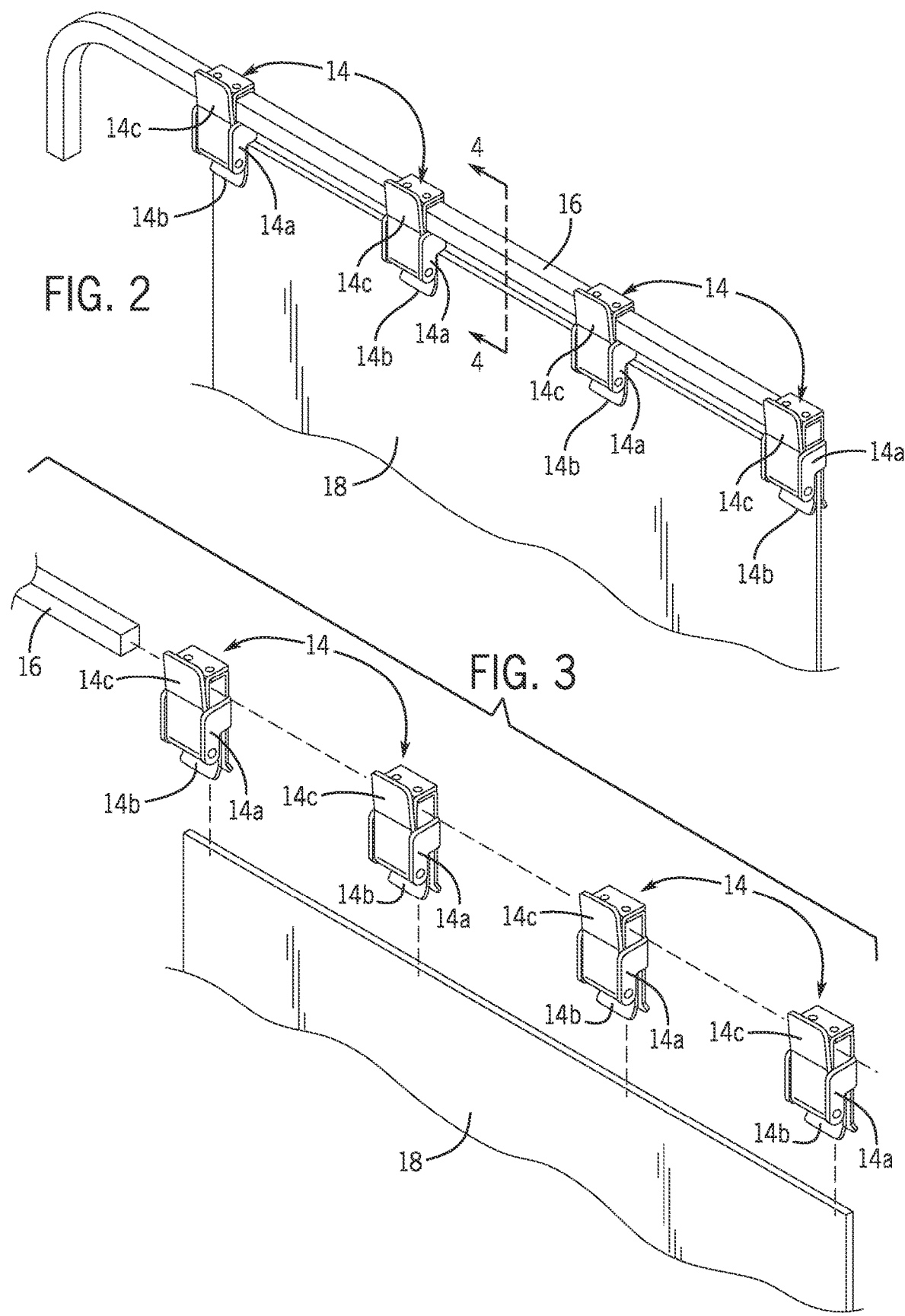

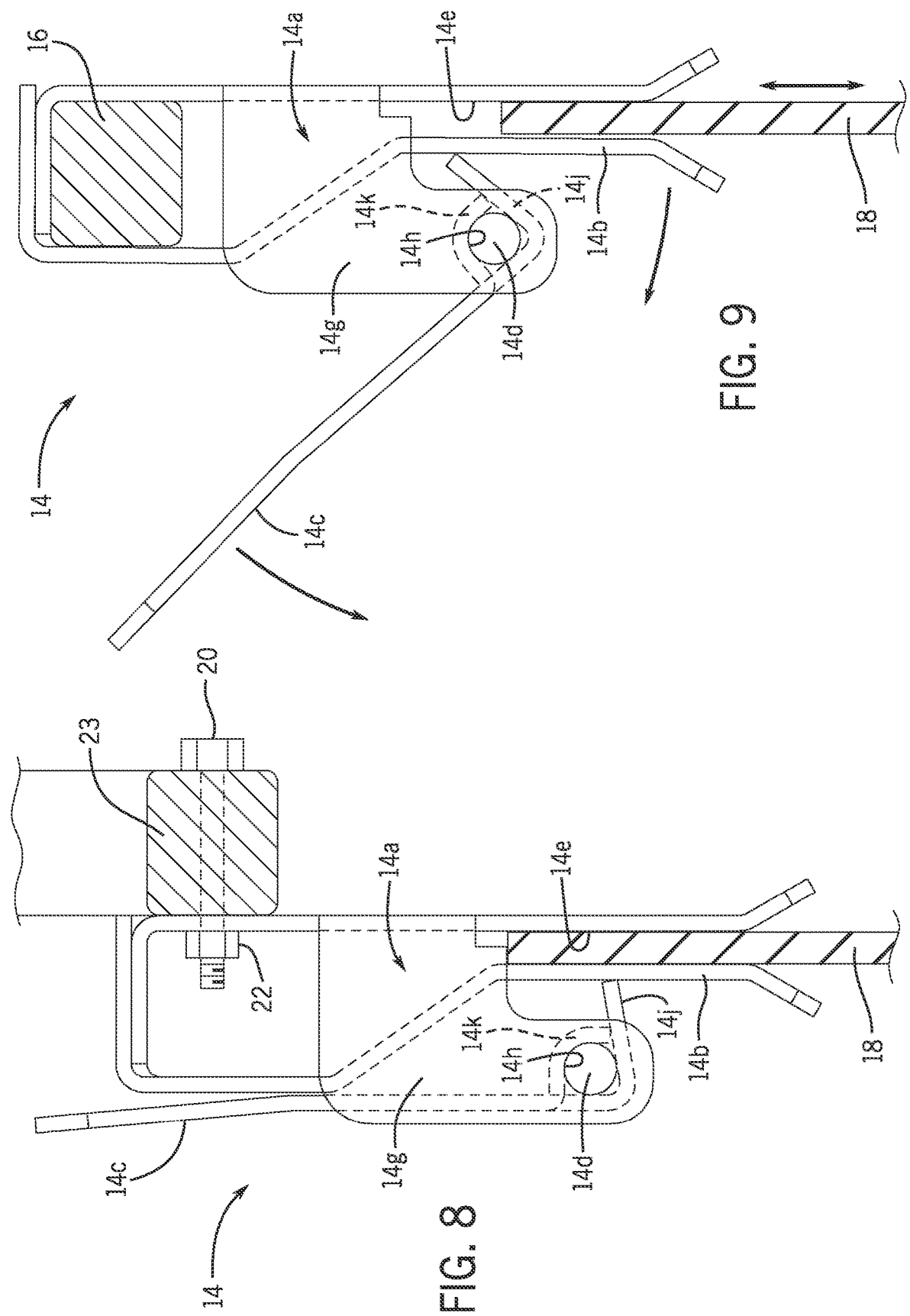

TOOLLESS MUD FLAP MOUNTING SYSTEM AND METHOD

CROSS-REFERENCE TO RELATED APPLICATION

This application claims the benefit of priority of U.S. provisional application No. 62/704,152, filed Apr. 24, 2020, the contents of which are herein incorporated by reference.

BACKGROUND OF THE INVENTION

The present invention relates to vehicle mud flaps and, more particularly, to quick release and quick install mud flaps for vehicles.

Conventional mud flaps require the use of hardware or tools for attachment to a vehicle, which is not always present in every situation during day-to-day life. Currently when mud flaps are torn off while driving, a driver is out of legal compliance until the flaps are reinstalled at a mechanic's shop or purchased new.

Conventional products in this field are essentially just nuts and bolts that secure the mud flap in place. These nuts and bolts corrode over time and require new nuts and bolts and a new flap, which require tools for installation and are typically installed by local repair shop. Truckers and other drivers lose time and money for repair. In addition, if they drive without a mud flap, citations are issued.

As can be seen, there is a need for an improved mud flap mounting system that reduces costs of operation, reduces driver time for a mud flap repair, and allows for fast release and installation.

SUMMARY OF THE INVENTION

In one aspect of the present invention, a mud flap mounting system includes: a vehicle body; a mud flap; and a mud flap clamp assembly comprising a plurality of mud flap clamp units installed on the vehicle body, and each of the plurality of mud flap clamp units comprising: a flap clamp bracket that selectively engages a first side of the mud flap; a flap pressure plate that selectively engages a second side of the mud flap; and a flap clamp that is operable to a first position such that a clamping force is applied to the flap pressure plate and such that the mud flap is frictionally engaged with and retained by the flap clamp bracket and the flap pressure bracket.

In another aspect of the present invention, a mud flap clamp assembly includes: a plurality of mud flap clamp units configured to be installed on a vehicle body, and each of the plurality of mud flap clamp units comprising: a flap clamp bracket that is configured to selectively engage a first side of a mud flap; a flap pressure plate that is configured to selectively engage a second side of the mud flap; and a flap clamp that is operable to a first position such that a clamping force is applied to the flap pressure plate.

These and other features, aspects and advantages of the present invention will become better understood with reference to the following drawings, description, and claims.

BRIEF DESCRIPTION OF THE DRAWINGS

FIG. 2 is a detail perspective view of the embodiment of the present invention, indicated by the line 2-2 of FIG. 1;

FIG. 3 is a detail exploded perspective view of the embodiment of the present invention, similar to the view shown in FIG. 2;

FIG. 8 is a cross-sectional view of the embodiment of the present invention, similar to FIG. 4, showing an alternative vehicle mounting configuration; and FIG. 9 is a cross-sectional view of the embodiment of the present invention, similar to FIG. 4, showing the embodiment in use.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, one embodiment of the present invention is a mud flap mounting system that does not require tools to mount the mud flap, in operation. A vehicle body and mud flap are provided as part of the overall system. Advantageously, rather than conventional tool-operated fasteners, a mud flap clamp assembly is provided. The mud flap clamp assembly includes a plurality of mud flap clamp units installed on the vehicle body. Each of the plurality of mud flap clamp units includes a flap clamp bracket, a flap pressure plate and a flap clamp. Each flap clamp bracket selectively engages a first side of the mud flap, and each flap pressure plate selectively engages a second side of the mud flap. Each flap clamp is operable to a first position such that a clamping force is applied to each respective flap pressure plate and such that the mud flap is frictionally engaged with and retained by each respective flap clamp bracket and each respective flap pressure bracket.

The present invention provides a releasable clamping mechanism that is quick and easy to use, rather than the conventional solution of nuts and bolts, which requires tools and can be time-consuming to install and remove the fasteners. Embodiments of the present invention enable a user to install the mud flaps without the use of tools or hardware, besides the clamp units themselves. Thus, when mud flaps are torn off while driving or otherwise away from a mechanic's shop, the present invention makes it possible to reinstall the mud flaps easily and efficiently.

Figure 1:
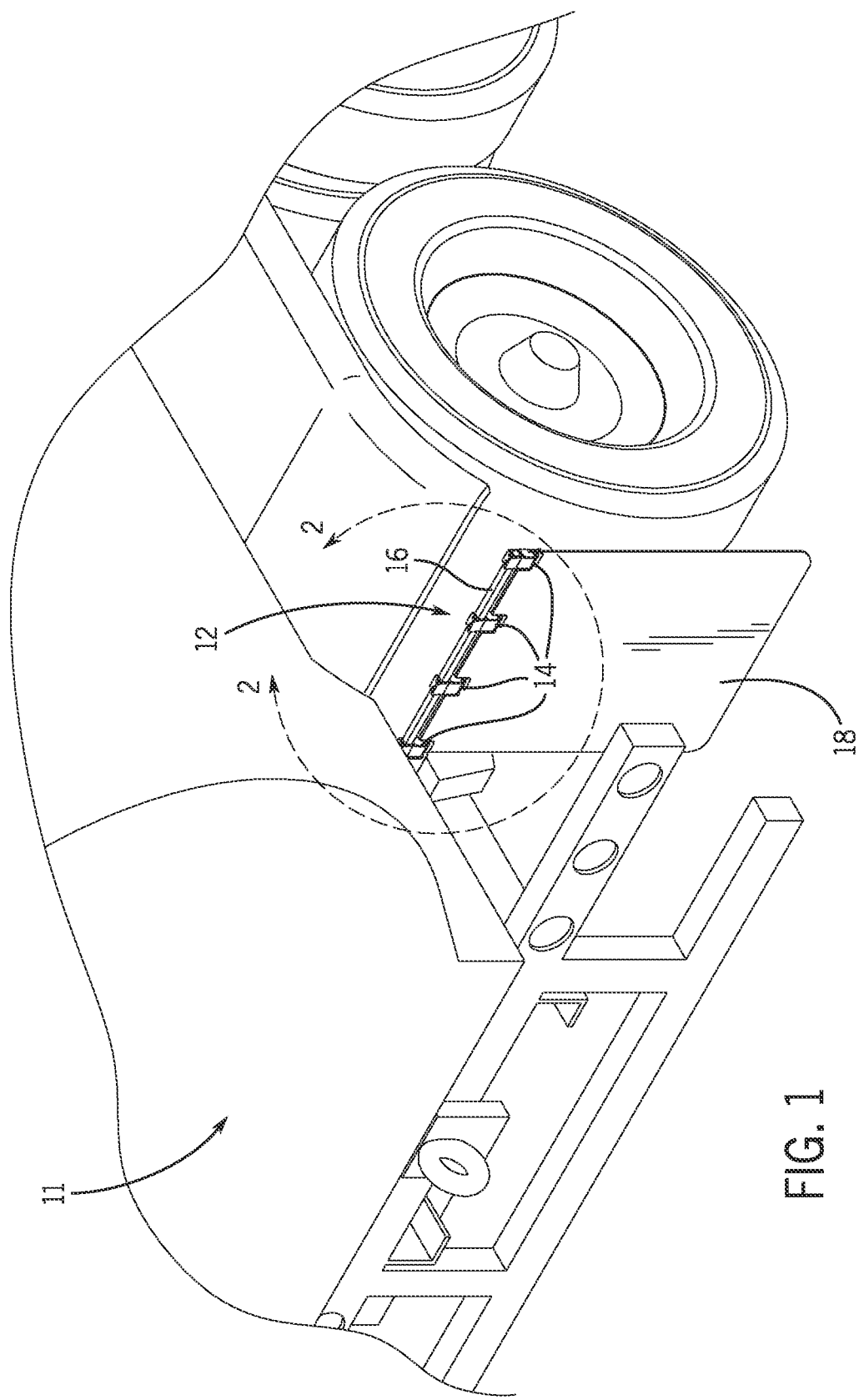
FIG. 1 is a perspective view of an embodiment of the present invention, in use.
Figure 6:
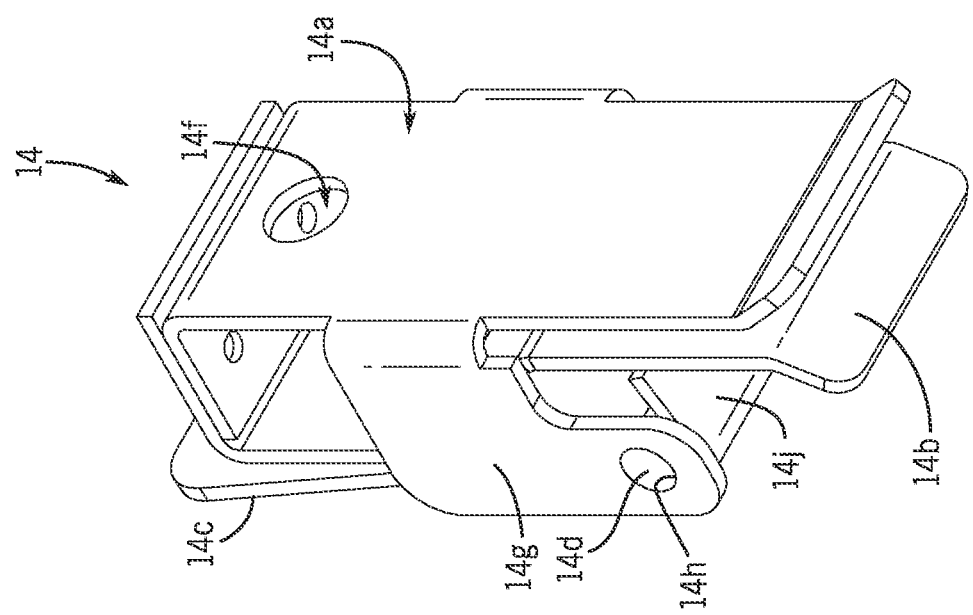
FIG. 6 is another perspective view of the quick clamp assembly of the present invention, showing an opposite side as compared to FIG. 5.
Figure 5:
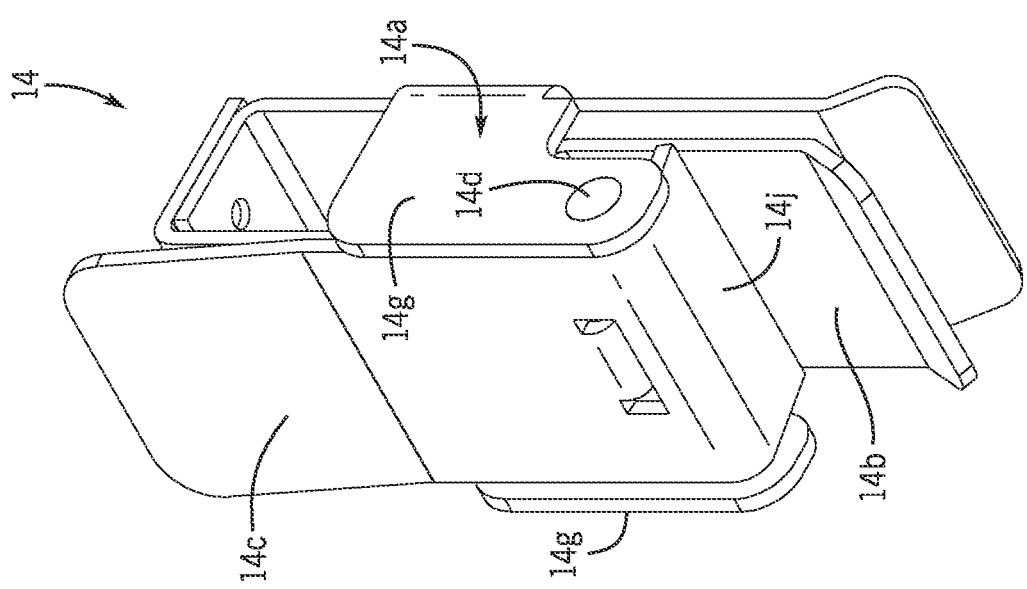
FIG. 5 is a perspective view of a quick clamp assembly of the embodiment of the present invention.
Figure 4:
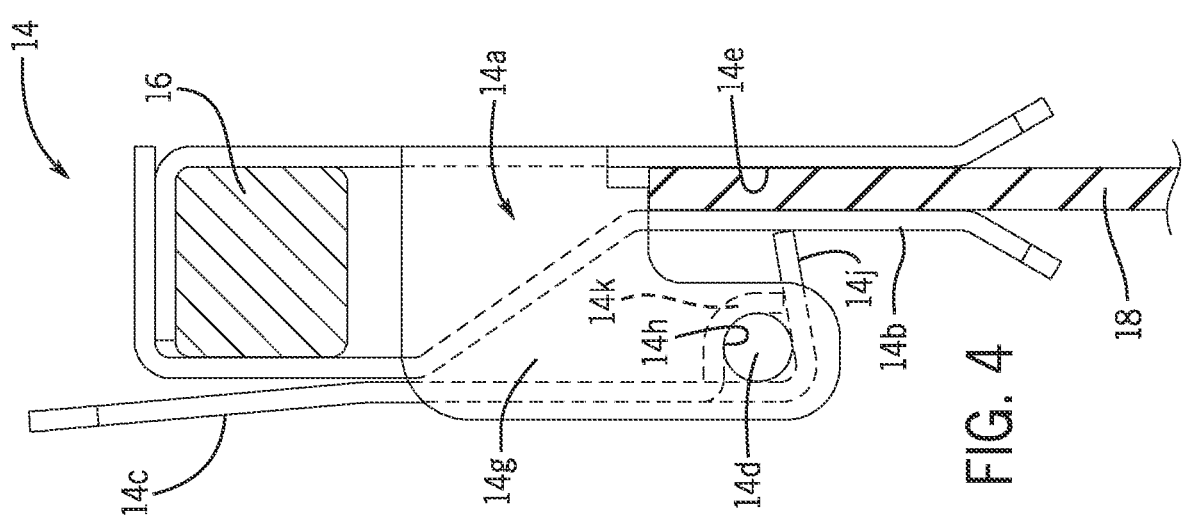
FIG. 4 is a cross-sectional detail elevation view of the embodiment of the present invention, taken on line 4-4 of FIG. 2.
Figure 7:
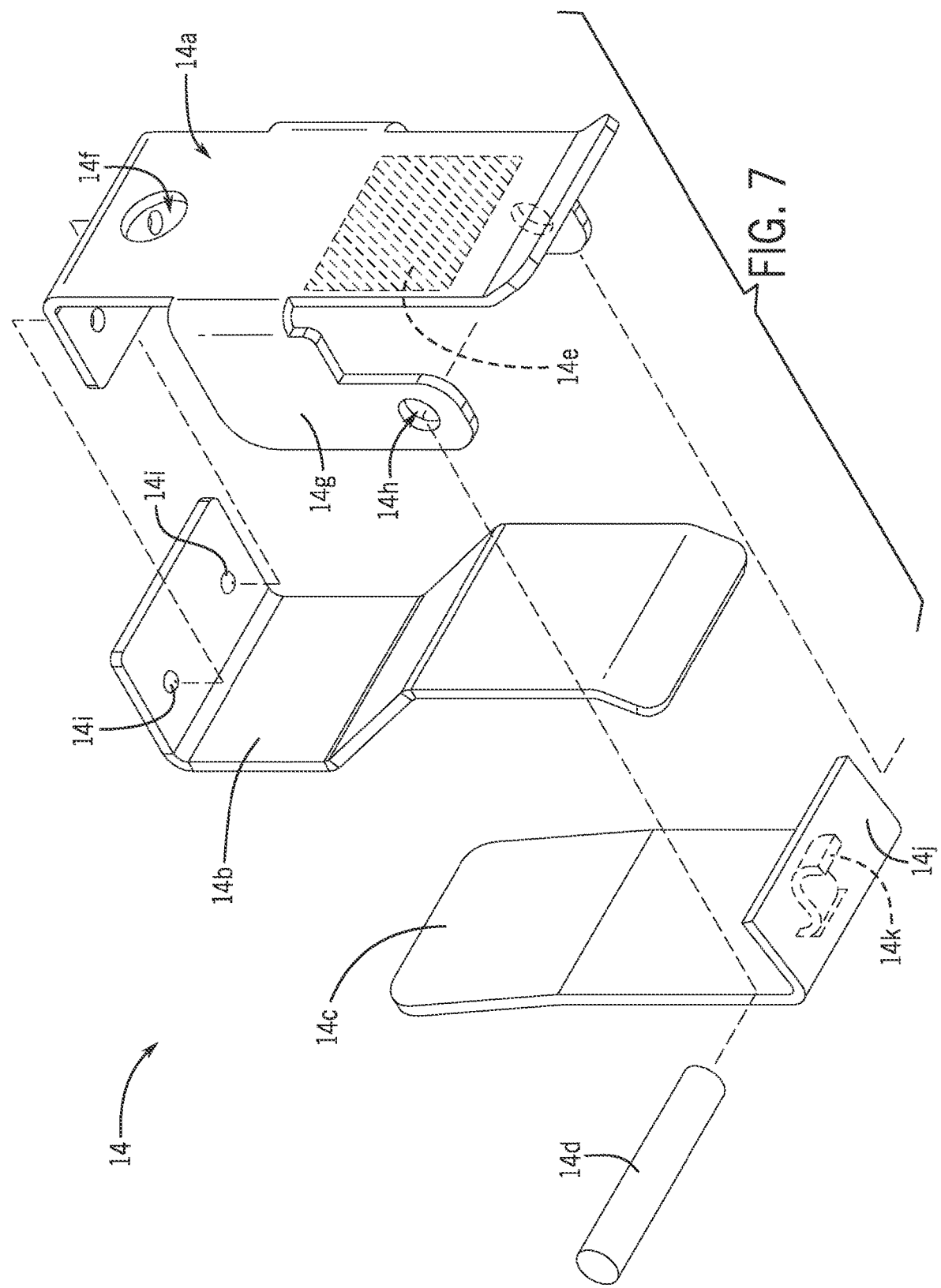
FIG. 7 is an exploded perspective view of the quick clamp assembly of the present invention.

Referring to FIGS. 1-9, a mud flap clamp assembly 12 is provided for retaining a mud flap 18 of a vehicle 11. The mud flap clamp assembly 12 is includes a plurality of clamp units 14 spaced from one another. The clamp units 14 may be configured to slide on a bar 16 of a vehicle 11, as shown in FIGS. 2-4, and attached using various appropriate means (such as by welding). Alternatively, as shown in FIG. 8, the clamp units 14 may couple directly to another portion 23 of a vehicle body using a coupling, such as a fastener 20 (e.g., a bolt) and a connector 22 (e.g., a nut), with the fastener 20 extending through an opening 14f defined in the clamp unit 14.

In accordance with certain aspects of the present invention, each clamp unit 14 includes a flap clamp bracket 14a, a flap pressure plate 14b, a flap clamp 14c. The flap clamp bracket 14a retains the flap clamp 14c via a pin 14d. As shown in FIGS. 4-8, when assembled, ends of the pin 14d engage with openings 14h defined in tabs 14g provided on opposite sides of the flap clamp bracket 14a and nests in a channel at least partially defined by a lower end 14j of the flap clamp 14c (see FIG. 4, for example) and a curved protrusion 14k, thus maintaining the connection between the clamp bracket 14a and flap clamp 14c. The flap clamp 14c, via the lower end 14j, applies a clamping force to the flap pressure plate 14b. In turn, the flap pressure plate 14b transmits the clamping force to the mud flap 18 to retain the mud flap 18 between the flap pressure plate 14b and the clamp bracket 14a, as shown in FIGS. 4 and 8. The flap clamp bracket 14a and flap pressure plate 14b may be attached to one another by, for example, welding, or various fastener mechanisms may be employed via openings 14i (the openings 14i also aiding with alignment of the pieces) disposed on top ends of the clamp bracket 14a and pressure plate 14b. Further, knurling 14e may be rolled into one or more surfaces of each clamp unit 14 to more securably retain (by increasing the friction therebetween) the flap 18 with the clamp unit 14.

In use, once the mud flap clamp units 14 are installed on a vehicle 11, a user may easily manually open them by pulling an upper portion of the flap clamp 14c downwards, as shown by the arrow extending in the counterclockwise direction in FIG. 9. This pulling causes a rotation of the flap clamp 14c about the pin 14d and results in the lower end 14j being moved away from the flap pressure plate 14b, thus removing the pressure previously applied to the flap pressure plate 14b. Because the clamping force is no longer applied (or is otherwise substantially reduced by the repositioning of the flap clamp 14c), the flap pressure plate 14b can open slightly, as shown by the arrow extending in the clockwise direction in FIG. 9. Thus, the flap 18 is no longer compressively retained between the flap pressure plate 14b and the flap clamp bracket 14a and can freely move into and out of the opening therebetween.

To reinstall the flap 18, the flap 18 may be lifted into the clamp units 14 (as shown in FIG. 9, for example, the flap clamp bracket 14a and flap pressure plate 14b have bent lower ends to more easily direct the flap into the clamp unit 14), and the upper portion of the flap clamp 14c is then pulled upwards until it reaches the position shown in FIGS. 4 and 8. In this position, the lower end 14j of the flap clamp 14c applies the compressive clamping force that retains the flap 18 to the clamp units 14. As would be readily apparent to those with skill in the art, the unique configuration described herein allows the flaps 18 to be easily adjusted left or right, flipped over and reinstalled if damaged on one end, entirely replaced, or the clamp units used to mount any other material that complies with various state highway regulations.

A method of making the present invention may include the following. Each mud flap unit 14 may be made as a metal melded component, but also may be produced via plastic injection molding or metal stamping. However, it will be appreciated that other manufacturing techniques may be employed in accordance with the present disclosure. Embodiments of the present invention may include any such appropriate material that will achieve the desired effect of securely retaining the mud flap 18 in place.

A method of using the present invention may include the following. First, the permanent fastening system on a vehicle 11 is a replaced with the mud flap clamp assembly 12 described above, using various attachment techniques (such as those shown in FIGS. 4 and 8 and described above). Alternatively, rather than a retrofit, the mud flap clamp assembly 12 may be installed when the vehicle is manufactured. Then, the flap clamp assembly 12 is opened in a manner as described above, the flap 18 is slid into the opening defined by the flap clamp bracket 14a and flap pressure plate 14b, and then the flap clamp assembly 12 is closed in a manner as described above to secure the flap 18 in place.

It should be understood, of course, that the foregoing relates to exemplary embodiments of the invention and that modifications may be made without departing from the spirit and scope of the invention as set forth in the following claims.

What is claimed is:

1. A mud flap mounting system comprising:
   a vehicle body;
   a mud flap; and
   a mud flap clamp assembly comprising a plurality of mud flap clamp units installed on the vehicle body, and each of the plurality of mud flap clamp units comprising:
      a flap clamp bracket that selectively engages a first side of the mud flap;
      a flap pressure plate that selectively engages a second side of the mud flap;
      a flap clamp that is operable to a first position such that a clamping force is applied to the flap pressure plate and such that the mud flap is frictionally engaged with and retained by the flap clamp bracket and the flap pressure bracket;
      two tabs extending from the flap clamp bracket towards the flap clamp; and
      a pin retained by the two tabs and a lower end of the flap clamp.

2. The mud flap mounting system of claim 1, wherein each flap clamp is further operable to a second position where little to no clamping force is applied and the mud flap is releasable from each of the plurality of mud flap clamp units.

3. The mud flap mounting system of claim 2, wherein each mud flap clamp unit further comprises:
   an upper end of the flap clamp that is configured to be operated by a user to move the flap clamp between the first position and the second position, wherein the lower end of the flap clamp, in the first position, presses on the flap pressure plate to apply the clamping force.

4. The mud flap mounting system of claim 1, wherein each flap clamp is pivotally mounted to the flap clamp bracket.

5. The mud flap mounting system of claim 4, wherein each flap clamp is disposed on the second side of the mud flap.

6. The mud flap mounting system of claim 1, wherein each mud flap clamp unit further comprises:
   an opening defined in each of the two tabs; and
   a protrusion disposed on the lower end of the flap clamp, wherein the pin is retained by the openings of the two tabs, the protrusion, and the lower end.

7. The mud flap mounting system of claim 1, wherein each flap clamp bracket includes a bracket lower end and each flap pressure plate includes a pressure plate lower end, and each bracket lower end and each pressure plate lower end bend away from the mud flap.

8. A mud flap clamp assembly comprising:
a plurality of mud flap clamp units configured to be installed on a vehicle body, and each of the plurality of mud flap clamp units comprising:
   a flap clamp bracket that is configured to selectively engage a first side of a mud flap;
   a flap pressure plate that is configured to selectively engage a second side of the mud flap;
   a flap clamp that is operable to a first position such that a clamping force is applied to the flap pressure plate;
   two tabs extending from the flap clamp bracket towards the flap clamp; and
   a pin retained by the two tabs and a lower end of the flap clamp.

9. The mud flap clamp assembly of claim 8, wherein each flap clamp is pivotally mounted to the flap clamp bracket.

10. The mud flap clamp assembly of claim 8, wherein each mud flap clamp unit further comprises:
   an opening defined in each of the two tabs; and
   a protrusion disposed on the lower end of the flap clamp, wherein the pin is retained by the openings of the two tabs, the protrusion, and the lower end.

\* \* \* \* \*